W. J. DONNELLEY.
WATER TIGHT COUPLING.
APPLICATION FILED MAY 31, 1910.
976,787.
Patented Nov. 22, 1910.
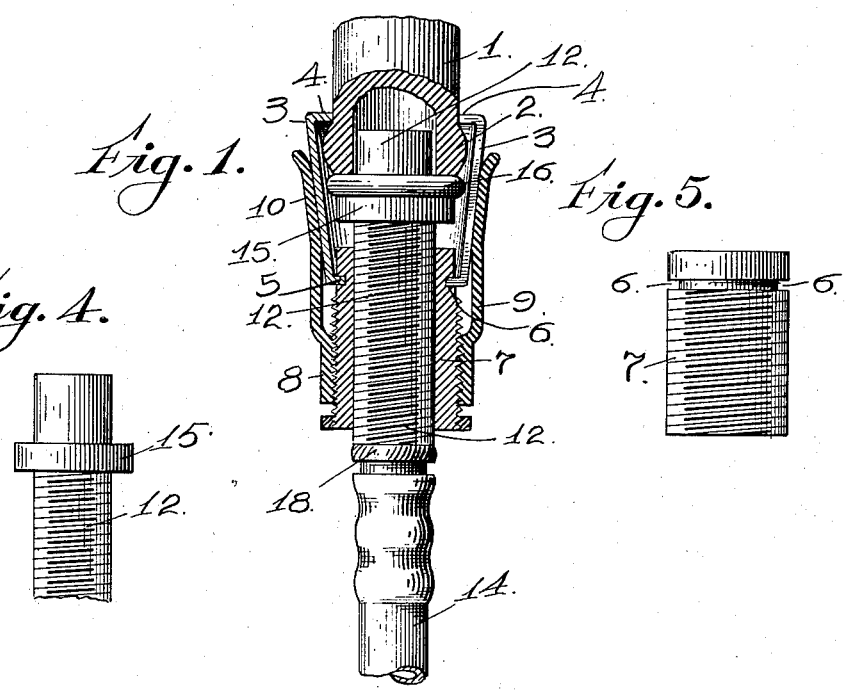
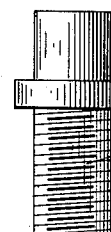
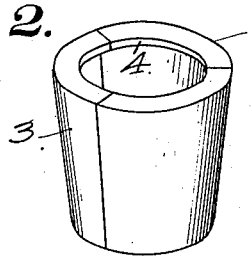
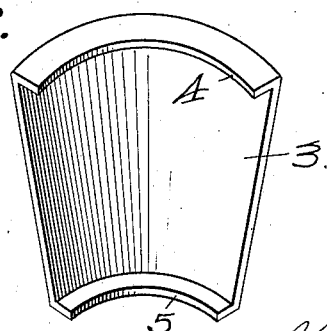
Witnesses:
Arthur L. Slee
Arthur White
Inventor:
William J. Donnelley

UNITED STATES PATENT OFFICE.

WILLIAM J. DONNELLEY, OF SAN FRANCISCO, CALIFORNIA.

WATER-TIGHT COUPLING.

976,787.  Specification of Letters Patent.  Patented Nov. 22, 1910.

Application filed May 31, 1910. Serial No. 564,264.

*To all whom it may concern:*

Be it known that I, WILLIAM J. DONNELLEY, a citizen of the United States, residing in the city and county of San Francisco, State of California, have invented a new and useful Improvement in Water-Tight Couplings, of which the following is a full and complete description.

My invention relates to improvements in connections for securing shower and other attachments to the faucets of bath tubs, where the nozzles of such faucets are of greater diameter than the end of the attachment, and has for its object a water tight joint that can easily be quickly fitted to faucets of any size. I accomplish this by means of the device shown in the accompanying drawing, in which—

Figure 1 is a sectional view of my coupling attached to a faucet. Fig. 2 is a perspective view of the conic section assembled. Fig. 3 is a perspective view of one of the sections. Fig. 4 is a detail of the inner tube, and Fig. 5 is a detail of the threaded and grooved sleeve.

1 is the end of a faucet having an annular shoulder 2, said shoulder 2 being engaged by three hollow conical sectors 3, these sectors being provided with internally annular flanges 4 and 5 at their top and bottom respectively. The bottom flanges 5 engage an annular groove 6 of the threaded sleeve 7. An outer sleeve 8 having an enlarged portion 9 and a flared end 10, is adapted to keep the lower flanges 5 of the sectors 3 within the groove 6 of the sleeve 7, in order to prevent a longitudinal movement of the sectors.

The withdrawal of the outer sleeve 8 with its flared portion 10, is adapted to allow a liberal movement of the upper ends of the sectors 3 laterally, but at the same time to prevent the flanges 5 from leaving the groove 6.

As the outer sleeve 8 is screwed upward, the flared portion 10, coming in contact with the sectors 3, causes the same to contract at the top and thus securely engage the shoulder 2 of the faucet 1.

A threaded inner tube 12, within the sleeve 7 has attached to its lower end a rubber hose 14, said hose 14 being connected to any bathing attachment, not shown, such as a shower ring, nozzle, brush, etc.

A collar 15 is provided near the upper end of the tube 12 on which rests a rubber washer 16. When the inner tube 12 is screwed upward, the upper end enters the faucet 1, until the washer 16 comes in contact with it. A slight additional turn of the tube 12 will suffice to cause the washer 16 to be securely engaged between the collar 15 and the faucet 1, thus forming a water tight joint between said faucet and the inner tube 12, to which the hose 14 is attached.

A knurled portion 18 on the lower end of the tube 12, provides a convenient means of manipulation.

It is apparent from the foregoing that my device is adapted to faucets of different size, inasmuch as the conic sectors 3 have a variable diameter at their upper ends, the sleeve 8 with its flared portion 10 being adapted to engage and securely hold the sectors to any obstruction with which they may come in contact. Having thus secured the sleeve 7 to the faucet 1, the inner tube can easily be brought into close contact with the faucet, the rubber washer forming a gasket between the two parts.

I do not wish to confine myself to the precise construction shown herein, but rather to avail myself of any modification that may fall properly within the scope of my invention.

Having thus described my invention, what I claim as new and desire to secure by Letters Patent is,

1. In a coupling, a threaded tube having an annular flange at or near its top, a rubber washer above the flange, a threaded sleeve on the tube, a groove at or near the top of the sleeve, hollow conical sectors having internal bottom flanges adapted to engage the groove, top internal flanges adapted to engage an obstruction on a faucet and an outer threaded sleeve adapted to collapse the sectors for the purpose described and in the manner set forth.

2. In a coupling for securing a hose and attachments to water faucets in bath tubs, a plurality of hollow conical sectors having internal annular flanges at the top, adapted to engage an annular protuberance on the faucet, similar flanges at the bottom of the sectors adapted to engage a groove on a hollow threaded sleeve, a second sleeve mounted thereon and adapted to engage the sectors for the purpose of causing their collapse, an inner tube having a collar near the top, and a rubber washer on the collar, for the purpose set forth.

In witness whereof I have hereunto affixed my signature in the presence of two subscribing witnesses.

WILLIAM J. DONNELLEY.

Witnesses:
 ARTHUR L. SLIE,
 JAMES F. McCUE.